United States Patent
Park

(10) Patent No.: US 9,488,973 B2
(45) Date of Patent: Nov. 8, 2016

(54) PROGRAMMABLE LOGIC CONTROLLER DEVICE AND METHOD FOR CONTROLLING THE SAME

(75) Inventor: Jo Dong Park, Cheonan-si (KR)

(73) Assignee: LSIS CO., LTD., Anyang-si, Gyeonggi-do (KR)

( * ) Notice: Subject to any disclaimer, the term of this patent is extended or adjusted under 35 U.S.C. 154(b) by 631 days.

(21) Appl. No.: 13/603,037

(22) Filed: Sep. 4, 2012

(65) Prior Publication Data

US 2013/0066441 A1  Mar. 14, 2013

(30) Foreign Application Priority Data

Sep. 14, 2011 (KR) .................. 10-2011-0092680

(51) Int. Cl.
*G05B 19/05* (2006.01)
(52) U.S. Cl.
CPC ..... *G05B 19/05* (2013.01); *G05B 2219/15057* (2013.01)
(58) Field of Classification Search
CPC ..................................... G05B 19/05
USPC .............................. 700/11; 326/41
See application file for complete search history.

(56) References Cited

U.S. PATENT DOCUMENTS 6,744,274 B1 * 6/2004 Arnold et al. .................. 326/16

FOREIGN PATENT DOCUMENTS

CN   101131575   2/2008
JP   2010-079356   4/2010

OTHER PUBLICATIONS

English Translation: Yokoo Masahiko, JP 2010-079356, Publication Apr. 8, 2010, Koyo Electronics Ind Co Ltd.*
The State Intellectual Property Office of the People's Republic of China Application Serial No. 201210343126.X, Office Action dated Jul. 24, 2014, 8 pages.

* cited by examiner

*Primary Examiner* — Tejal Gami
(74) *Attorney, Agent, or Firm* — Lee, Hong, Degerman, Kang & Waimey PC

(57) ABSTRACT

Provided are a PLC device and a method for controlling the same. The method includes: receiving input data from an external; storing the received input data in an input area of a data input/output unit; reading the input data from the input area of the data input/output unit in order to perform a calculation operation; storing output data, which is a result of the calculation operation, in an output area of the data input/output unit; and transmitting the output data in the output area of the data input/output unit to an output circuit.

8 Claims, 7 Drawing Sheets

FIG.7

```
//INPUT ASIC ADDRESS:0XA00000 ~ 0xAFFFFF
//OUTPUT ASIC ADDRESS:0xB00000 ~ 0xBFFFFF
Define IN0     0xA00000
Define OUT0    0xB00000

//Program Start
.start
Load IN0  ←~-41
Store OUT0 ←~-42
Call END
Jump start
    ⋮

//Program End
```

A PROGRAMMABLE LOGIC CONTROLLER DEVICE AND METHOD FOR CONTROLLING THE SAME

CROSS-REFERENCE TO RELATED APPLICATIONS

Pursuant to 35 U.S.C. 119(a), this application claims the benefit of earlier filing date and right of priority to Korean Patent Application No. 10-2011-0092680, filed on 14 Sep. 2011, the contents of which is incorporated by reference herein in its entirety.

BACKGROUND

The present disclosure relates to a Programmable Logic Controller (PLC) device and a method for controlling the same.

The present disclosure relates to a Programmable Logic Controller (PLC) device and a method for controlling the same. More specifically, the present disclosure relates to a PLC device for outputting a performance result while a sequence program is performed with a plurality of calculation processes, and a method for controlling the same. Unlike a typical PLC sequence program (which accesses a memory in order to output a calculation result), the method accesses an Application Specific Integrated Circuit (ASIC) in order to output a calculation result, so that confirmation may be made on the calculation result while a sequence program is performed.

A PLC is a highly autonomous control device, which replaces a relay control board function such as a relay timer and a counter in a conventionally-used control board with a semiconductor device such as a Large Scale Integration (LSI) chip and a transistor in order to add a mathematical function to a basic sequence control function for a program control, and scans the start and end of a program in a memory to perform a logic operation.

FIGS. 1 and 2 are views illustrating a configuration of a typical PLC device.

As shown in FIGS. 1 and 2, the typical PLC device includes an input circuit 200, a control unit 100, and an output circuit 300.

The input circuit 200 receives an input signal or input data from an external. The input circuit 200 may include resistors R1 and R2 connected in series and parallel, a data input unit 220 for delivering an input signal to the control unit 100, and a first photo coupler 210. The first photo coupler 210 completely insulates the input circuit 200 from the output circuit 230, thereby delivering an input signal but preventing an external disturbance signal from being delivered to the control unit 100.

The output circuit 300 outputs output data, i.e. a calculation result on the input data. The output circuit 300 may include a second photo coupler 310, a resistor R3, a switching device 320, and a data output unit 330.

The control unit 100 performs a calculation operation on the input data and controls other data inputs/outputs. The control unit 100 includes a controller 110 for controlling the data input unit 220 and the data output unit 330 and a memory 120 for storing input/output data.

The data input unit 220 and the data output unit 330 may use an ASIC or a Field Programmable Gate Array (FPGA).

When the ASIC is used, it includes a storage area for temporarily storing data to be processed internally. Additionally, an address for access is assigned to the storage area. When accessing the data input unit 220, the controller 110 has an address for a specific area in the data input unit 220. In the same manner, when accessing the data output unit 330, the controller 110 has an address for a specific area in the data output unit 330.

As shown in FIG. 1, according to a conventional way, when the controller 110 reads input data, the input data are stored in the memory 130 first; a chip selection command CS and a read command RD are delivered to the data input unit 220; and then, the data input unit 220 reads the input data from the memory 120.

Additionally, as shown in FIG. 2, according to a conventional way, when data are outputted to an external, a writing command WR is delivered to the data output unit 330 in order to be recorded on a memory; the address of data to be outputted and a read command RD are delivered to the data output unit 330; and then, the data output unit 330 reads the data to be outputted from the memory and delivers them to an external.

That is, a conventional PLC device has an issue in terms of wasting memory space.

Moreover, in general, a conventional PLC device does not transmit/receive data to/from an input/output port during a program calculation operation. Since all program calculation operations need to be completed before data are outputted and a calculation result is confirmed, input/output data loss occurs.

For example, when data are stored in an output image area of an i-address at least two times during a program calculation operation, the last stored data are outputted to an output port. Accordingly, when an output of the i-address is required to be changed N times during program execution, the program needs to be programmed in order to be performed at least N times.

When j-address input data are changed during an $N^{th}$ program calculation operation, since a j-address input image area is updated before an $N+1^{th}$ program calculation operation, the changed data may not be used in the $N^{th}$ program calculation operation.

If the data, which are changed during the $N^{th}$ program calculation operation, are changed again before the $N^{th}$ program calculation operation is finished, it is not recognized that the input is changed during program execution.

SUMMARY

Embodiments provide a PLC device for confirming a calculation result during calculation execution and requiring no memory, and a method for controlling the same.

In one embodiment, a method for controlling a Programmable Logic Controller (PLC) includes: receiving input data from an external; storing the received input data in an input area of a data input/output unit; reading the input data from the input area of the data input/output unit in order to perform a calculation operation; storing output data, which is a result of the calculation operation, in an output area of the data input/output unit; and transmitting the output data in the output area of the data input/output unit to an output circuit.

The transmitting of the output data into the output circuit may be performed when the output data are stored in the output area according to the calculation operation.

The data input/output unit may be an Application Specific Integrated Circuit (ASIC).

The input area is may be an area corresponding to an input address of the data input/output unit.

The output area may be an area corresponding to an output address of the data input/output unit.

The method may further include performing a calculation operation on input data changed according to whether the input data are changed, and transmitting output data according to the result of the calculation operation to the output circuit.

In another embodiment, a PLC device includes: a data input unit for receiving input data inputted from an external and storing the received input data in an input area; a data output unit for receiving output data according to a result of a calculation operation on the input data and storing the received output data in an output area; and a control unit for reading the input data from the input area of the data input unit in order to perform a calculation operation, and according thereto, storing output data according to a result of the performed calculation operation in the output area of the data output unit.

The control unit may transmit an address command, a CHIP SELECTION (CS) command, and a READ (RD) command on input data to the data input unit in order to read the input area of the data input unit and read input data according to a result of the reading operation.

The control unit may transmit an address command, a CS command, and a WRITING (WR) command on output data to the data output unit in order to store the output data in the output area.

When output data are stored in the output area of the data output unit, the control unit may transmit the stored output data to an output circuit.

The input area may be an area corresponding to an input address of the data input unit.

The output area may be an area corresponding to an output address of the data output unit.

When the input data stored in the input area are changed, the control unit may perform a calculation operation on the changed input data, and may store a result of the performed calculation operation in the output area.

At least one of the data input unit and the data output unit may include a photo coupler in order to be insulated from the control unit.

The data input unit and the data output unit may be an Application Specific Integrated Circuit (ASIC).

The details of one or more embodiments are set forth in the accompanying drawings and the description below. Other features will be apparent from the description and drawings, and from the claims.

BRIEF DESCRIPTION OF THE DRAWINGS

FIG. 7 is a view illustrating an example of source codes to implement an operation of a PLC device according to an embodiment of the present invention.

DETAILED DESCRIPTION OF THE EMBODIMENTS

Suggested embodiments will be described below.

Hereinafter, detailed embodiments of the present invention will be described with reference to the accompanying drawings. The invention may, however, be embodied in many different forms and should not be construed as being limited to the embodiments set forth herein; rather, that alternate embodiments included in other retrogressive inventions or falling within the spirit and scope of the present disclosure can easily be derived through adding, altering, and changing, and will fully convey the concept of the invention to those skilled in the art.

The terms used in the present invention are selected from currently widely used general terms. However, the applicant may arbitrarily select the terms in certain cases, and their meanings are described in the detailed description of the embodiments. Therefore, the terms should be understood with their meanings not names That is, in the description below, the meaning of "include," "comprise," "including," or "comprising," specifies a property, a region, a fixed number, a step, a process, an element and/or a component but does not exclude other properties, regions, fixed numbers, steps, processes, elements and/or components.

Hereinafter, embodiments of the present invention will be described with reference to the accompanying drawings.

Figure 1:
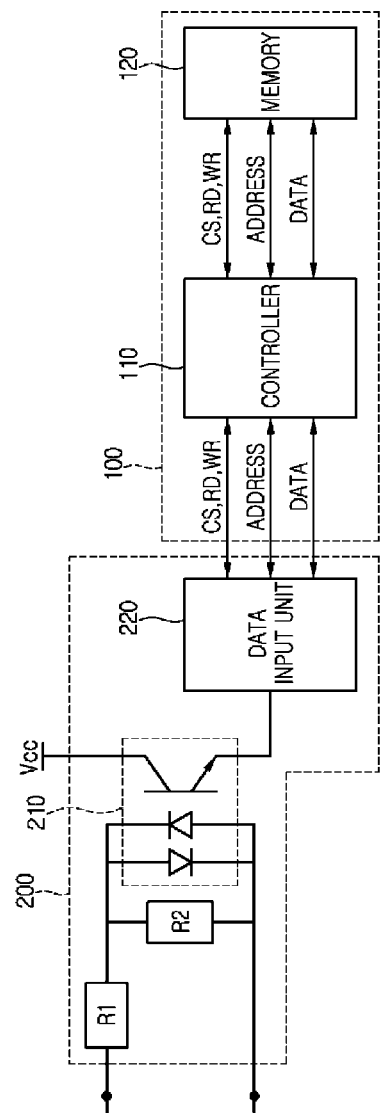
FIGS. 1 and 2 are views illustrating a configuration of a typical PLC device.
Figure 2:
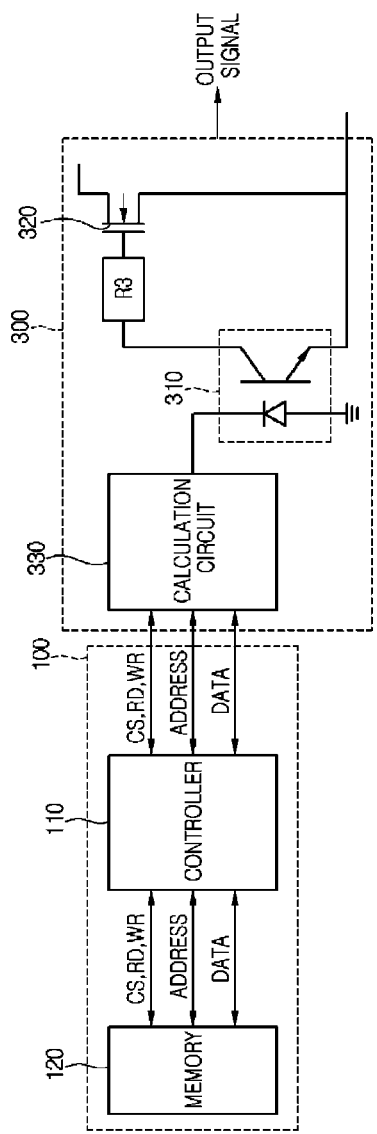
Figure 3:
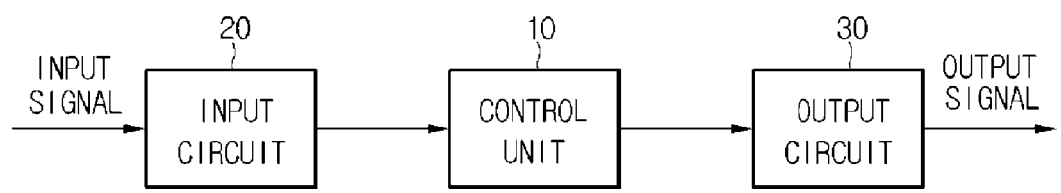
FIG. 3 is a view illustrating a configuration of a PLC device according to an embodiment of the present invention.

FIG. 3 is a view illustrating a configuration of a Programmable Logic Controller (PLC) device according to an embodiment of the present invention.

As shown in FIG. 3, the PLC device includes an input circuit 20 for receiving an input signal or input data, a control unit 10 for performing calculation on the input data and controlling other data inputs/outputs, and an output circuit 30 for outputting output data, i.e. a calculation result on the input data.

The input circuit 20 is a circuit for receiving data that the PLC device is to process. The input circuit 20 receives data to be processed and delivers them to the control unit 10. Input data may vary according to an application field to which the PLC device is applied. For example, the input data may include the temperature of a factory, the height of a robot arm installed at a factory, and the speed of a conveyer belt that conveys products.

The output circuit 30 is a circuit for outputting a processing result processed by the control unit 10. The output circuit 30 receives a processing result on input data from the control unit 10, and then, outputs it to an external. A processing result on input data may also vary according to an application field of the PLC device.

For example, if the PLC device controls a temperature, a calculation result may include an air conditioning operation or a heater operation according to a measured surrounding temperature.

Additionally, if the PLC device controls the height of a robot arm, a calculation result may include a command for raising the robot arm or a command for lowering the robot arm.

Figure 4:
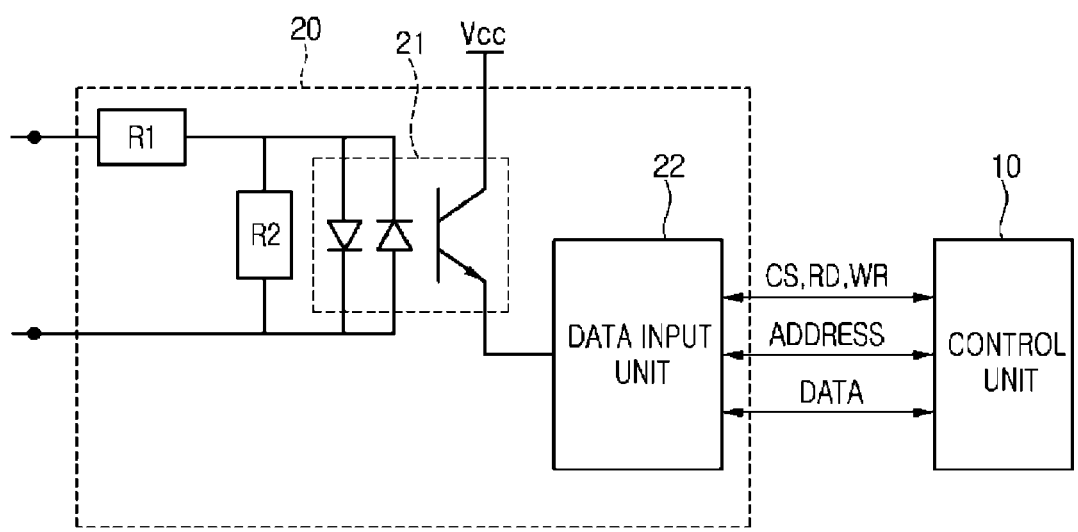
FIG. 4 is a view illustrating a configuration and operations of a control unit and an input circuit according to an embodiment of the present invention.

FIG. 4 is a view illustrating a configuration and operations of a control unit 10 and an input circuit 20 according to an embodiment of the present invention.

Once input data are received from an external, according to a conventional way, the received input data are recorded on a memory first. But, according to the present invention, a procedure for recording data on a memory is omitted.

That is, in relation to the PLC device according to the present invention, a process for storing input data on a memory is omitted, and accordingly, no memory for data processing is required. At this point, the memory may be used as another purpose, i.e. storing a command code for controlling an operation of the control unit 10.

As shown in FIG. 4, the input circuit 20 includes resistors R1 and R2 connected in series and parallel, a first photo coupler 21, and a data input unit 22.

The first photo coupler 21 delivers a signal but prevents an external disturbance signal from being delivered to the control unit 10.

The data input unit 22 may use an ASIC or an FPGA. The ASIC may have arbitrary types such as a custom type IC, a gate array type IC, and a semi-custom type IC. The semi-custom type IC includes a standard cell type in which a semi-finished product includes a chip with preconfigured basic components such as a counter, a timer, and a flip-flop and the components are connected in the chip to form a desired circuit.

When the ASIC is used, it includes a storage area for temporarily storing data to be processed internally. Additionally, an address for access is assigned to the storage area. When accessing the data input unit 22, the controller 10 has an address for an input area in the data input unit 22.

For example, as shown in FIG. 4, when reading input data, the control unit 10 directly reads the input data from the data input unit 22 by using the address of the data input unit 22 in addition to chip selection and read commands CS and RD.

That is, according to a conventional way, in order for the control unit 10 to read input data, the input data are stored in a memory first, the CS and RD commands are delivered to the ASIC, and then, the ASIC reads the input data from the memory.

However, according to the present invention, the control unit 10 temporarily stores input data in the input area of the data input unit 22, and directly reads the input data through the address for the input area of the data input unit 22.

Figure 5:
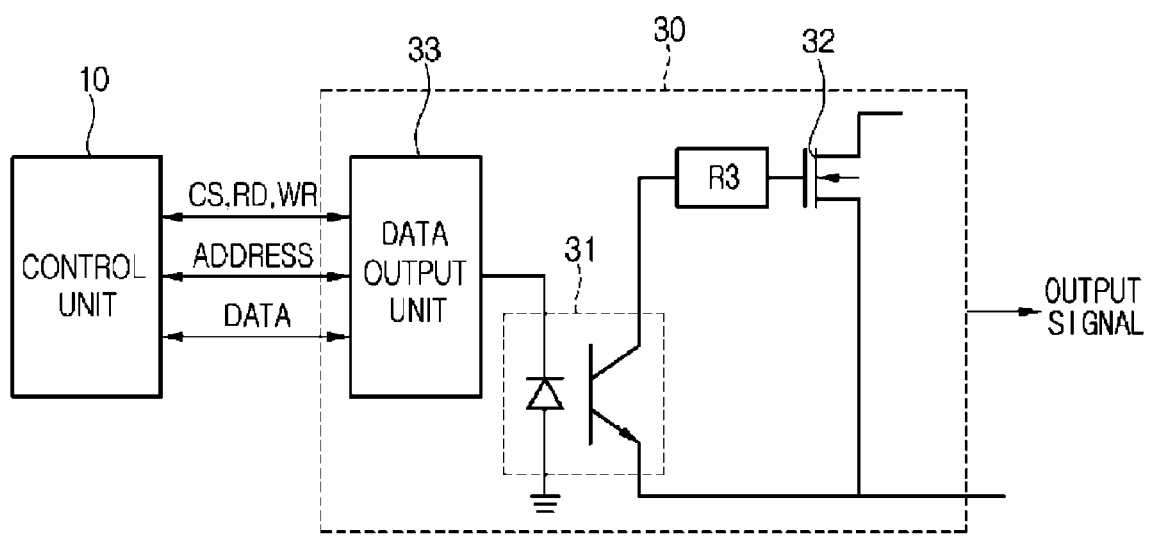
FIG. 5 is a view illustrating a configuration and operations of a control unit and an input circuit according to an embodiment of the present invention.

FIG. 5 is a view illustrating a configuration and operations of a control unit 10 and an output circuit 30 according to an embodiment of the present invention.

Like a process for receiving input data, a memory is not used when processed data are outputted to an external.

According to a conventional way, when data are outputted to an external, a writing command WR is delivered to the data output unit 330 in order to be recorded on a memory; the address of data to be outputted and a read command RD are delivered to the data output unit 33; and then, the data output unit 33 reads the data to be outputted from the memory and delivers them to an external. However, according to the present invention, the memory is not used to output the data to an external.

That is, in the PLC device according to the present invention, a data storing process to read data to be outputted from a memory is omitted, and data to be outputted in direct access to the data output unit 33 are recorded (stored) in the output area of the data output unit 33. The data output unit 33 outputs the data recorded therein. Accordingly, no memory for data processing is required.

As shown in FIG. 5, the output circuit 30 includes a second photo coupler 31, a resistor R3, and a switching device 32.

According to an embodiment of the present invention, the data input unit 22 may be separated from the data output unit 33, but may be configured to be one.

Figure 6:
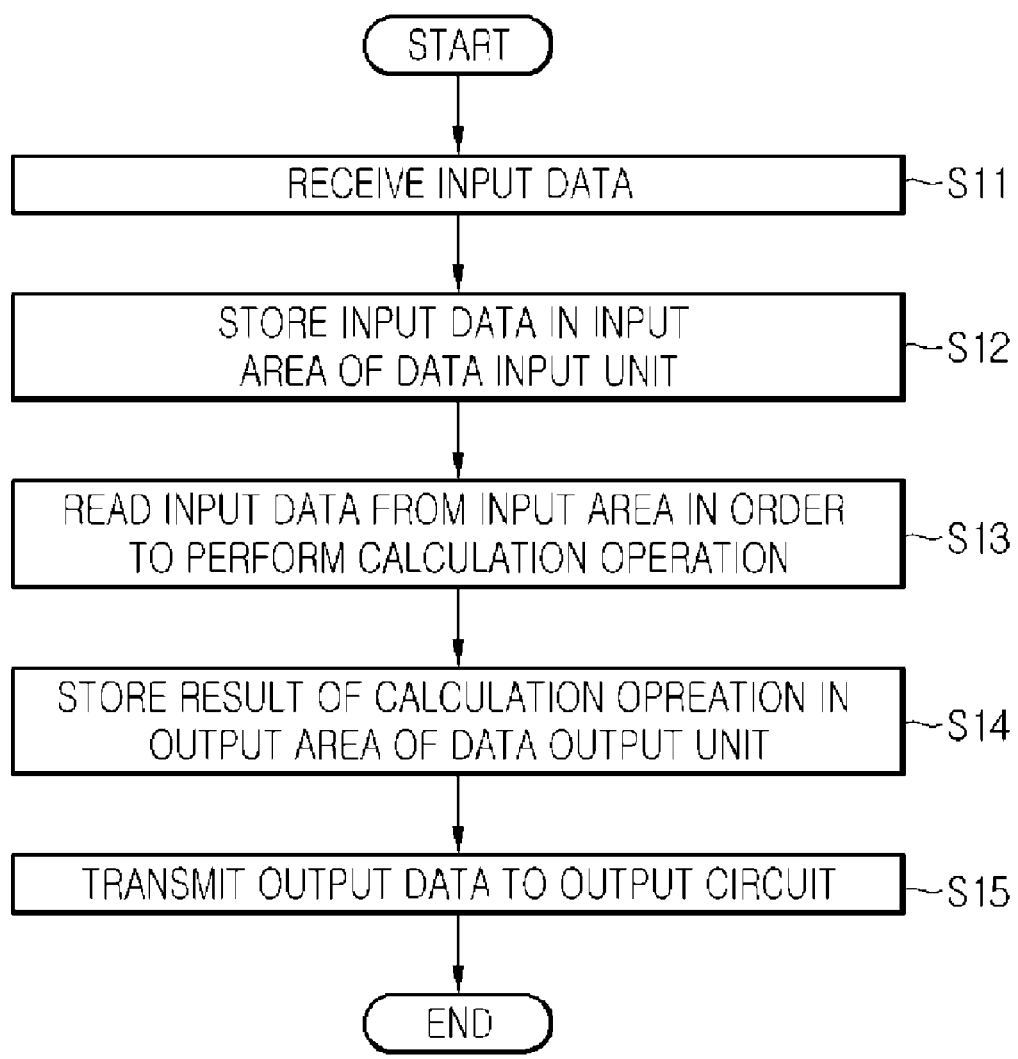
FIG. 6 is a flowchart illustrating operations of a PLC device according to an embodiment of the present invention.

FIG. 6 is a flowchart illustrating operations of a PLC device according to an embodiment of the present invention.

In relation to an operation of the PLC device, when a plurality of calculations are included in a PLC sequence command, or input data are changed during one sequence operation, an output result on each of the plurality of calculations or a calculation result on the changed input data may be outputted.

The input circuit 20 receives input data from an external in operation S11.

The received input data are temporarily stored in the input area, i.e. an area where input data are stored, of the input unit 22 in the control unit 10 in operation S12.

The control unit 10 transmits a control command to the input area of the data input unit 22 in order to read input data through a process for reading the input area of the data input unit 22.

The data input unit 22 may use an ASIC or an FPGA. The ASIC may have arbitrary types such as a custom type IC, a gate array type IC, and a semi-custom type IC. The semi-custom type IC includes a standard cell type in which a semi-finished product includes a chip with preconfigured basic components such as a counter, a timer, and a flip-flop and the components are connected in the chip to form a desired circuit.

When the ASIC is used, it is a circuit for performing a calculation process but includes a storage area for temporarily storing data to be processed internally. Additionally, an address for access is assigned to the storage area. When accessing the data input unit 22, the controller 10 has an address for an input area in the data input unit 22.

The control command includes an address command and chip selection and read commands CS and RD on data to be read.

The control unit 10 performs calculation on the read input data in operation S13. Then, the control unit 10 stores a calculation result on the input data in the output area of the data output unit 33.

The control unit 10 transmits a control command to the data output unit 33, and then, stores the output data in the output area of the data output unit 33 in operation S14.

The control command includes an address command and chip selection and write commands CS and WR on data to be outputted.

Then, the control unit 10 transmits the output data recorded in the output area of the data output unit 33 to the output circuit 30 in operation S15. The output circuit 30 allows an external connection device to perform an operation corresponding to input data by using the received output data.

According to the above-mentioned method for controlling a PLC device, since the control unit 10 directly reads or writes data from or on the data input unit 22 and the data input unit 22 used for input/output port control, input/output data are updated during a program operation, thereby preventing input/output data loss and reducing a waste of memory used as an input/output image area.

FIG. 7 is a view illustrating an example of source codes to implement an operation of a PLC device according to an embodiment of the present invention.

An input ASIC address of FIG. 7 indicates the input area of the data input unit 22 and an output ASIC address indicates the output area of the data output unit 33.

Unlike a conventional way that reads the input image area of a memory during a program operation for reading input data, a first command 41 directly reads '0xA00000', i.e. an address of the input area in an ASIC.

A second command 42 has a format for writing data in '0xB000000', i.e. the output area of the ASIC when a data output program is performed.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling a Programmable Logic Controller (PLC), the method comprising:
   receiving input data from an external source;
   temporarily storing the received input data at an input address internal to a data input unit and not corresponding to a memory of the PLC;
   directly reading the stored input data from the input address via a control command comprising the input address internal to the data input unit;
   temporarily storing output data that is a result of a first calculation operation on the read input data via a control command comprising an output address internal to a data output unit, wherein the output data is temporarily stored at the output address internal to the data output unit and not corresponding to a memory of the PLC; and
   transmitting the output data to an output circuit when the output data is temporarily stored at the output address after the first calculation operation,
   wherein temporality storing the output data comprises:
   temporarily storing an output result of a second calculation operation of a plurality of calculation operations when the plurality of calculation operations are included in a PLC sequence command, and
   temporarily storing another output result of a calculation operation on changed input data when the read input data is changed during a calculation operation.

2. The method according to claim 1, wherein the data input unit and data output unit are Application Specific Integrated Circuits (ASICs).

3. A Programmable Logic Control (PLC) device comprising:
   a data input unit for receiving input data from an external source and temporarily storing the received input data at an input address internal to the data input unit and not corresponding to a memory of the PLC device;
   a data output unit for receiving output data according to a result of a calculation operation performed on the received input data and temporarily storing the received output data at an output address internal to the data output unit and not corresponding to a memory of the PLC device; and
   a control unit for:
   directly reading the stored input data from the input address via a control command comprising the input address internal to the first input unit;
   temporarily storing output data that is a result of a first calculation operation on the read input data via a control command comprising an output address internal to a data output unit, wherein the output data is temporarily stored at the output address internal to the data output unit; and
   transmitting the output data to an output circuit when the output data is temporarily stored at the output address after the first calculation operation,
   wherein temporarily storing the output data comprises:
   temporarily storing an output result of a second calculation operation of a plurality of calculation operations when the plurality of calculation operations are included in a PLC sequence command, and
   temporarily storing another output result of a calculation operation on changed input data when the read input data is changed during a calculation operation.

4. The PLC device according to claim 3, wherein the control unit is further for transmitting a CHIP SELECTION (CS) command and a READ (RD) command to the data input unit in order to read the stored input data.

5. The PLC device according to claim 3, wherein the control unit is further for transmitting a CS command and a WRITING (WR) command to the data output unit in order to store the output data.

6. The PLC device according to claim 5, wherein the control unit is further for transmitting the stored output data to an output circuit.

7. The PLC device according to claim 3, wherein at least the data input unit or the data output unit comprises a photo coupler such that it is insulated from the control unit.

8. The PLC device according to claim 3, wherein the data input unit and the data output unit are Application Specific Integrated Circuits.

* * * * *